United States Patent
Margolese et al.

(10) Patent No.: US 7,349,488 B1
(45) Date of Patent: Mar. 25, 2008

(54) FREQUENCY SHIFT KEYING SIGNALING FOR INTEGRATED CIRCUITS

(75) Inventors: Michael A. Margolese, Campbell, CA (US); James A. Watson, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 842 days.

(21) Appl. No.: 10/412,533

(22) Filed: Apr. 10, 2003

(51) Int. Cl.
*H04L 27/10* (2006.01)
*H04L 27/12* (2006.01)
*H03K 9/10* (2006.01)

(52) U.S. Cl. .................. 375/272; 375/269; 332/100
(58) Field of Classification Search ............. 375/224, 375/272, 344, 279, 280, 379, 269; 326/21–35, 326/99; 257/275; 329/300; 332/100; 340/825.58
See application file for complete search history.

(56) References Cited

U.S. PATENT DOCUMENTS

| | | | | |
|---|---|---|---|---|
| 4,575,858 A | * | 3/1986 | Dow ........................... | 375/280 |
| 4,740,995 A | * | 4/1988 | Schevin et al. ............. | 375/296 |
| 4,994,766 A | * | 2/1991 | Miura ......................... | 332/117 |
| 5,789,991 A | * | 8/1998 | Ishii ............................ | 332/100 |
| 5,815,043 A | * | 9/1998 | Chow et al. ................. | 331/57 |
| 6,437,713 B1 | * | 8/2002 | Lesea .......................... | 341/78 |
| 6,816,559 B1 | * | 11/2004 | Sirito-Olivier et al. ..... | 375/344 |
| 6,920,627 B2 | * | 7/2005 | Blodget et al. .............. | 716/17 |
| 2003/0050099 A1 | * | 3/2003 | Izadpanah .................... | 455/562 |
| 2003/0161411 A1 | * | 8/2003 | McCorkle et al. .......... | 375/295 |
| 2003/0223510 A1 | * | 12/2003 | Kurakami et al. .......... | 375/297 |
| 2004/0001560 A1 | * | 1/2004 | Darabi ........................ | 375/303 |

OTHER PUBLICATIONS

Das, Amplitude-/frequency Shift Keying (AFSK), ), Oct. 16-16, 2000, International Conference on Signal Processing Applications & Technology.*
Falkowski et al., New Sign Hadamard-Haar- Transform in Ternary Communication System, 48th Midwest Symposium on Circuits and Systems, Aug. 7-10, 2005, vol. 1, pp. 123-126.*
Anthony Cataldo; "Multilevel Signals Rise to Occasion"; EE Times; Mar. 27, 2003; downloaded on Apr. 9, 2003 from wysiwyg://73/http://www.eetimes.com/story/OEG20030327S0027; pp. 1-4.

* cited by examiner

*Primary Examiner*—Mohammed Ghayour
*Assistant Examiner*—Lawrence Williams
(74) *Attorney, Agent, or Firm*—Kim Kanzaki; W. Eric Webostad

(57) ABSTRACT

The present invention relates to a system for communicating between two integrated circuits (ICs) or within an IC. The ICs are either on the same circuit boards or on different circuit boards with a common backplane. A first integrated circuit has transmitter circuit that generates frequency shift keying signals using digital data and a second integrated circuit has a receiver circuit for recovering the digital data from the frequency shift keying signals.

22 Claims, 14 Drawing Sheets

FREQUENCY SHIFT KEYING SIGNALING FOR INTEGRATED CIRCUITS

FIELD OF THE INVENTION

The present invention relates to integrated circuits, and more particularly to high speed communications between integrated circuits on a printed circuit board, and between integrated circuits on different printed circuit boards having a common backplane. Communication within an integrated circuit is further included.

BACKGROUND OF THE INVENTION

Communications between integrated circuits (ICs) on a printed circuit board (PCB) or between ICs on different PCBs with a common backplane have conventionally used digital signaling, e.g., a level-sensitive binary protocol. For example, logic 0 is normally represented by a low voltage level, while logic 1 is represented by a high voltage level. A simplified example of such a system is shown in FIG. 1. FIG. 1 shows two ICs, i.e., IC 50 and IC 51. A simplified input/output buffer in each IC is shown (e.g., buffers 52-1 and 53-1). Expanded buffer 52-2 represents buffer 52-1 of IC 50 and expanded buffer 53-2 represents buffer 53-1 of IC 51. In FIG. 1, pad 56 is attached to an output buffer, i.e., output driver 60, and pad 57 attached to an input buffer 61 (note an actual pad would be attached to both an input buffer and an output driver). Output driver 60 delivers to pad 56 a signal having a high or a low voltage level, depending on the logic state of an input line 62. Pads 56 and 57 are connected by a metal trace 63 on a PCB.

Ideally input line 62 would have a voltage square wave with one of two voltage levels, having the output data, i.e., the logic 1's and 0s' from IC 50. The output data would go via output driver 60 to pad 56 and then travel via trace 63 to pad 57. The output data from IC 50 would then be input data to IC 51. The input data is buffered by input buffer 61 and goes to the rest of the IC 51 circuitry via output line 64.

As the speed of communications increases, e.g., in the gigahertz (GHz) range and above, the use of square waves with the amplitude having the data, starts to have significant bit error rate problems. One reason is that signal degradation, e.g., amplitude degradation and continuous phase shift, occur as a signal travels down a transmission line, e.g., trace 63. This signal degradation increases with the frequency of the signal. In addition, the fundamental and multiple harmonic frequencies that comprise a square wave undergo different phase shifts when propagating down a transmission line, i.e., dispersion occurs. These effects are exacerbated by the decreasing rise and fall times of the edges of the received square wave at, e.g., IC 51, that approximate the transmitted square wave at, e.g., IC 50. Hence the probability increases that the receiver will make a mistake in determining the logic levels of the received data.

Therefore there is a need in the high speed communication of data between IC's for an improved technique of signaling other than using binary amplitude changes on a square wave, i.e., binary digital signaling.

SUMMARY OF THE INVENTION

The present invention relates to a method and system for communicating between at least two ICs using amplitude or frequency modulated, or both, signaling. The ICs are located either on the same PCB or on different PCBs having a common backplane. In addition the present invention includes amplitude or frequency modulated, or both, signaling between components on an IC. The amplitude or frequency modulated, or both, signaling includes amplitude, frequency, or phase modulation or any combination thereof. More specifically, a preferred embodiment uses frequency modulation.

One embodiment includes a system for communicating between two integrated circuits. The system includes, a first integrated circuit having a transmitter circuit for converting digital data into a frequency modulated signal, where the first integrated circuit is positioned on a first printed circuit board; a second integrated having a receiver circuit for converting the frequency modulated signal back to the digital data, where the second integrated circuit is positioned on the first printed circuit board or on a second printed circuit board, wherein the second printed circuit board is connected to the first printed circuit board via a common backplane; and a connection, preferably a wired connection, for connecting the transmitter and the receiver circuits.

Another embodiment of the present invention includes a method for communicating between two integrated circuits. The first integrated circuit is positioned on a first printed circuit board. The second integrated circuit is positioned on the first printed circuit board or on a second printed circuit board, where the second printed circuit board is connected to the first printed circuit board via a common backplane. First, digital data from a first integrated circuit is transformed into a frequency modulated signal. Next, the frequency modulated signal is sent to the second integrated circuit. Lastly, the second integrated circuit recovers from the frequency modulated signal the digital data.

Yet another embodiment of the present invention includes a system for communicating data between a plurality of components in an integrated circuit. The system includes a first component having an output circuit for converting digital data of the first component into a frequency modulated signal; a second component having an input circuit for converting the frequency modulated signal back to the digital data; and a connection in the integrated circuit for connecting the input and the output circuits.

The above summary of the present invention is not intended to describe each disclosed embodiment of the present invention. The figures and detailed description that follow provide additional example embodiments and aspects of the present invention.

DETAILED DESCRIPTION OF THE INVENTION

The present invention relates to a new communication method and system between integrated circuits and between components in an integrated circuit. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
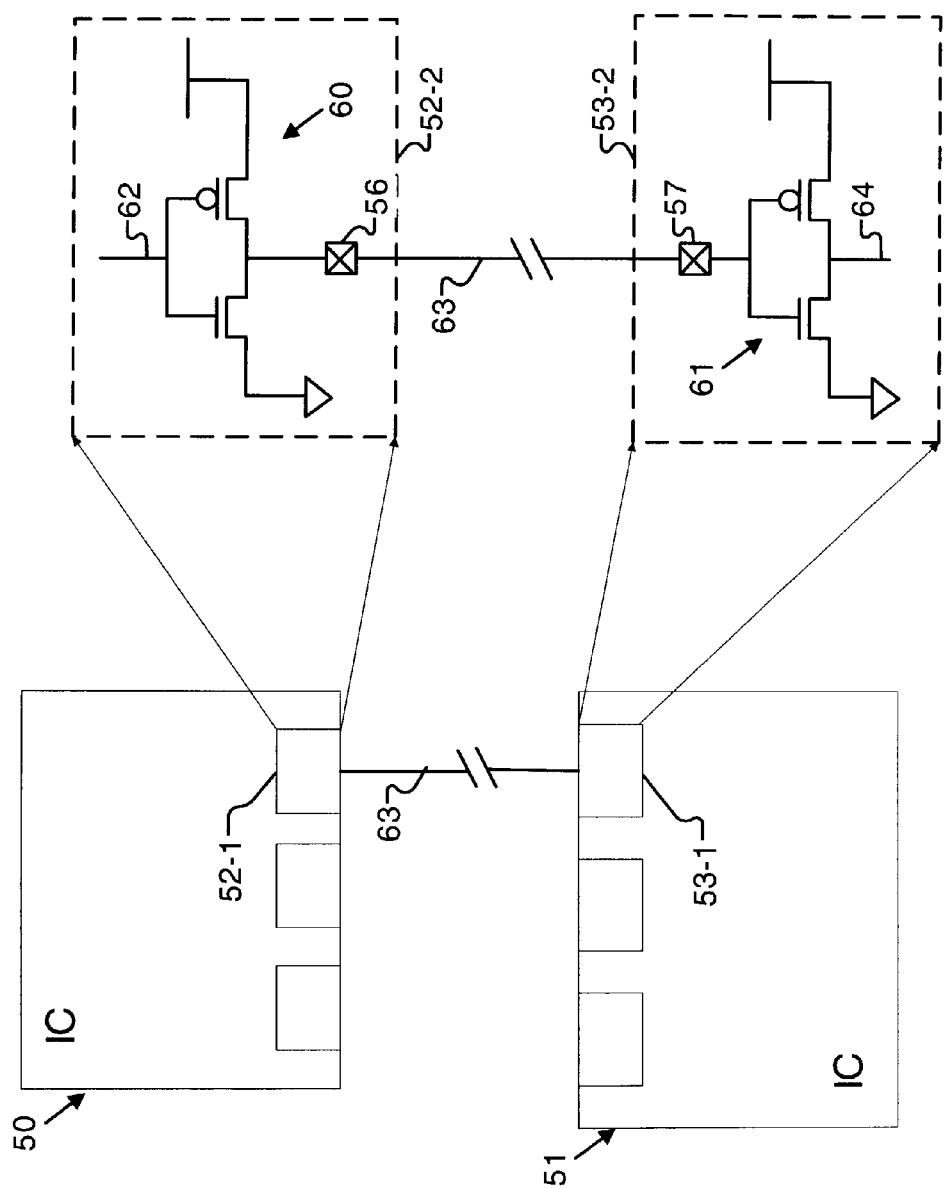
FIG. 1 shows a prior art IC communication system.

As explained above for ICs on a PCB, the typical common channel is the "wire," e.g., 63 of FIG. 1, connecting the source, e.g., 52-2 to the sink, e.g., 53-2. This wire on the external I/O's of IC is often a copper wire (trace) implanted in a substrate. Two example configurations in a PCB are microstrip and stripline trace. The physical nature of this channel is described by a set of mathematical models called transmission line theory. A transmission line may be approximately modeled by a linear system. A linear system regardless of its implementation can only effect or change the phase and/or amplitude of its input function. Hence a metal trace or wire can only delay a signal or degrade a signal's amplitude not change the signal's frequency. This indicates that frequency modulation is a better signaling method than binary digital signaling for high-speed communications.

In frequency modulation different logic levels are encoded using different frequencies. For example, for logic 0 and logic 1 two frequencies can be used, one for each logic level. Since the transmitted and received frequencies are the same, the problems associated with using amplitude modulation alone over a transmission line are significantly reduced.

While amplitude or frequency modulated, or both, signaling is well known, one major reason frequency or phase modulation has not been used for communication between ICs on a PCB or on different PCBs with a common backplane, is the extra circuitry that needs to be added to the IC. In light of the megahertz communication speeds and size of the circuitry needed, conversion from digital data to amplitude or frequency modulated, or both, signaling and back to digital data was considered impractical.

However today, with communication speeds increasing into the GHz range and above, transmission line effects are becoming a significant problem. Because there is also an ever-decreasing size of the circuitry needed, the present invention's use of amplitude or frequency modulated, or both, signaling between ICs is now both advantageous and practical.

Figure 2:
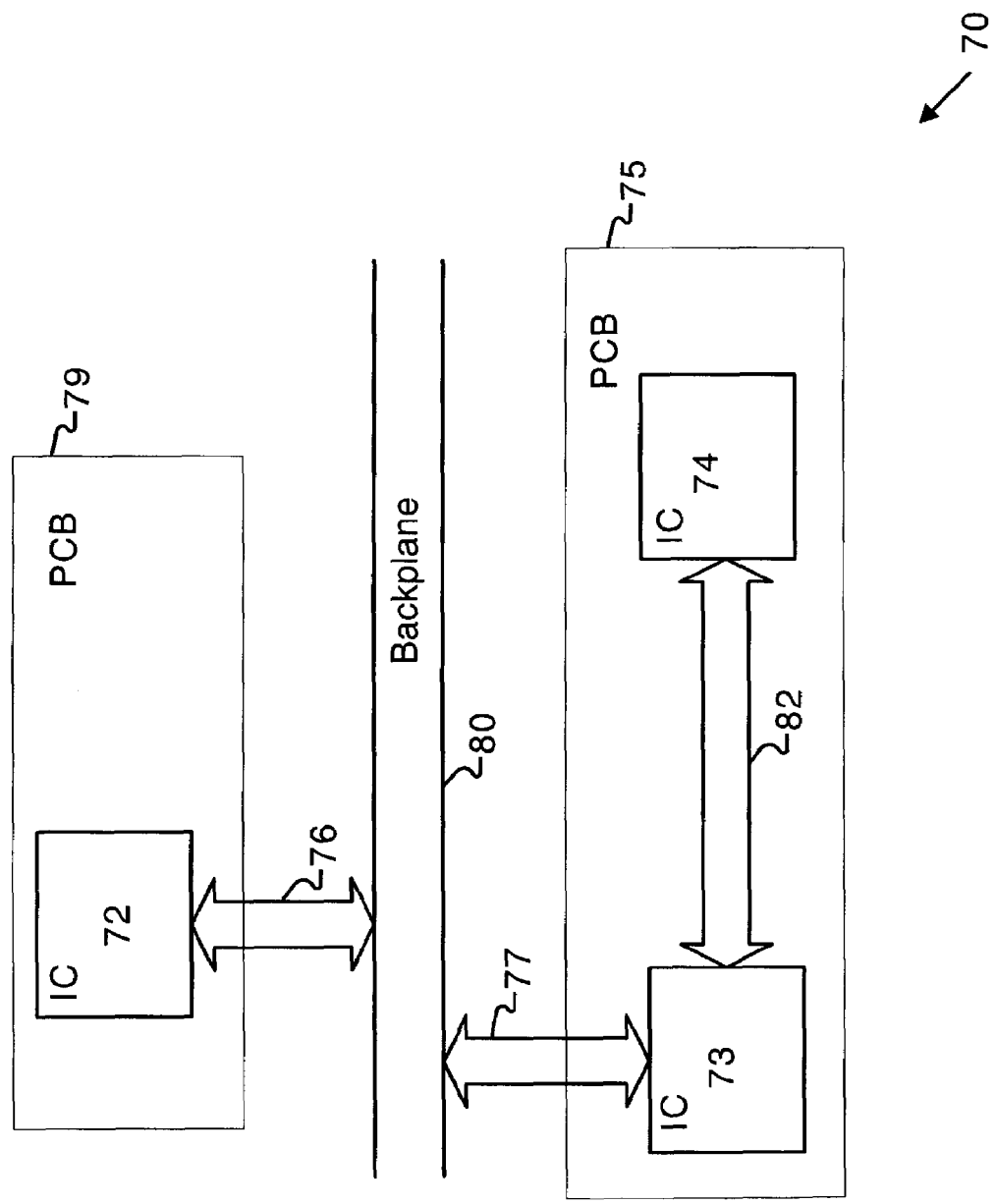
FIG. 2 is a block diagram showing a system in which an embodiment of the present invention can be used.

FIG. 2 is a block diagram showing a system 70 in which an embodiment of the present invention can be used. System 70 contains a plurality of ICs, such as ICs 72-74, that are connected directly or indirectly to each other. ICs 73 and 74 are on PCB 75 and connected by metal traces shown schematically by 82. PCB 75 is connected to IC 72 on PCB 79 via backplane 80. Examples of the ICs include field programmable gate arrays, programmable logic devices, digital signal processors, microprocessors, audio processors, video graphics processors, and applications specific integrated circuits.

In a preferred embodiment of the present invention amplitude or frequency modulated, or both, signaling having amplitude or frequency modulation or both is used to send digital data, e.g., bits, between IC's on the same PCB or between IC's on different PCB's having the same backplane. The amplitude or frequency modulated, or both, signaling avoids some of the significant problems, e.g., signal degradation, of digital signaling as the speed and density of ICs increases. In an alternative embodiment amplitude, phase, or frequency modulation or a combination thereof are used to communicate data between ICs. In other embodiments, amplitude, phase, frequency modulation or a combination thereof, is used to communicate data between components on an IC, for example, configurable logic blocks (CLBs) in a field programmable gate array (FPGA).

Figure 3:
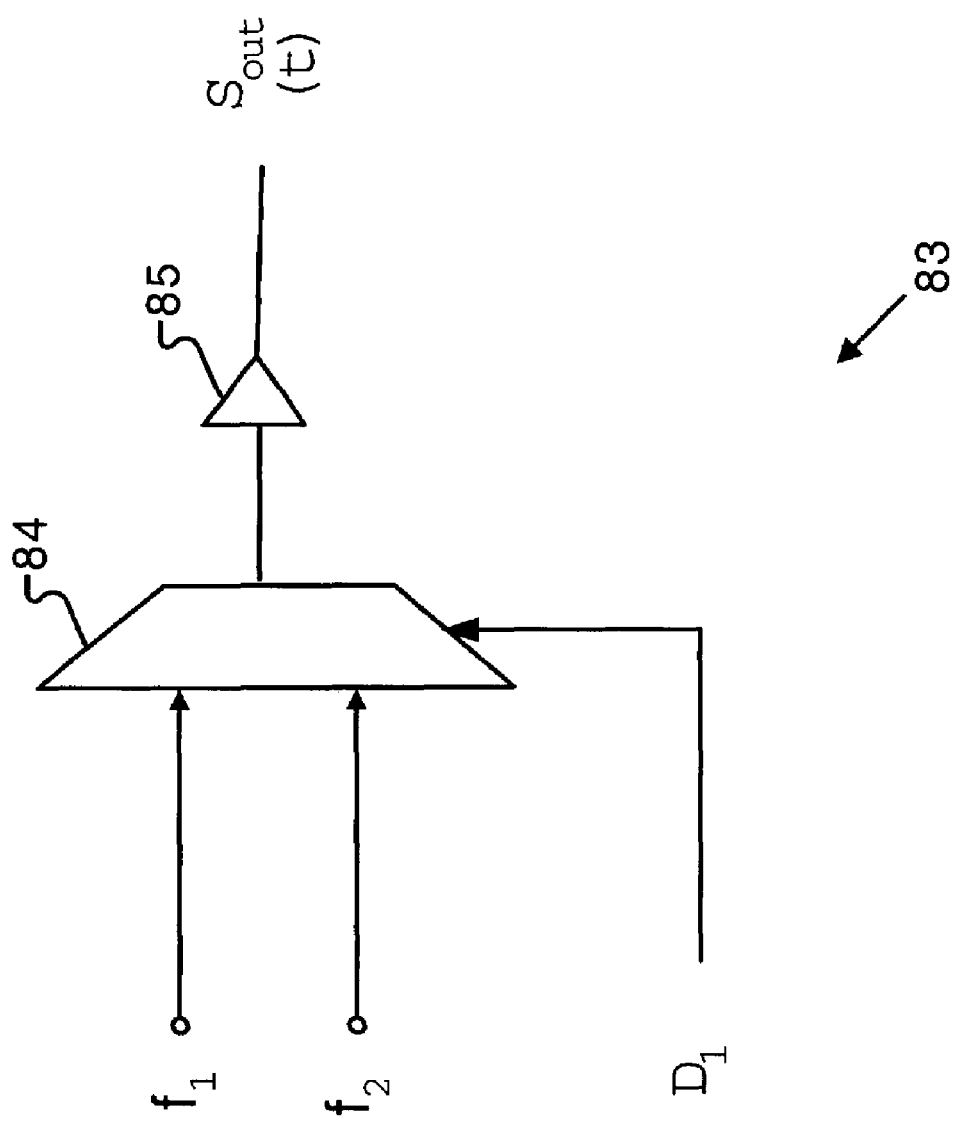
FIG. 3 is a schematic of a simplified transmitter (modulator) of one embodiment of the present invention.
Figure 4:
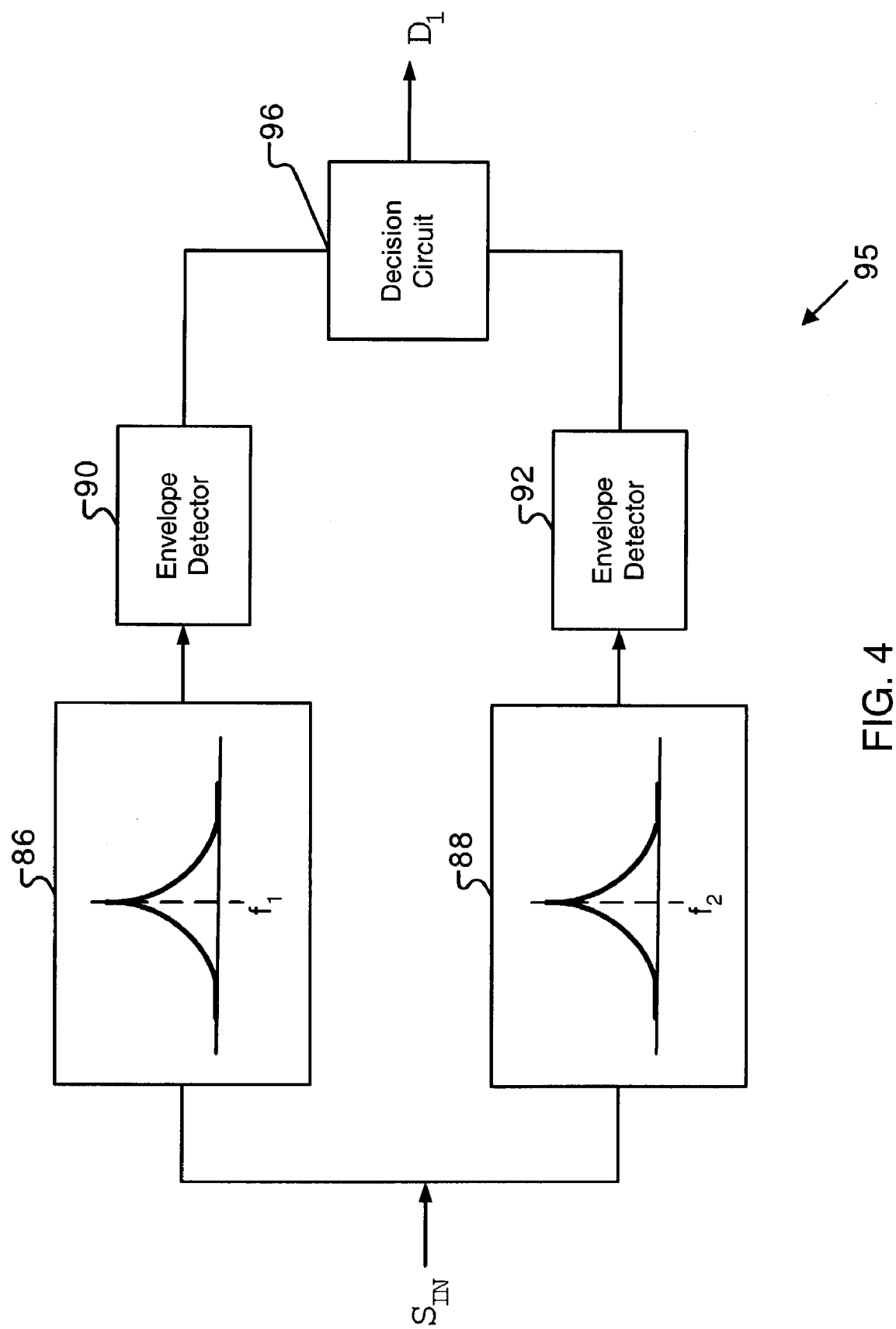
FIG. 4 is a schematic of a simplified non-coherent receiver (demodulator) of one embodiment of the present invention.

FIGS. 3 and 4 are implementations of a frequency modulation and demodulation system of an embodiment of the present invention. For ease of illustration only, two frequencies ($f_1$ and $f_2$), are used to represent one bit of data ($D_1$). However, it should be apparent to one of ordinary skill in the art that two or more frequencies representing one or more bits may be used in similar implementations.

The voltage output signal "vout(t)" for a given input binary digital signal "vin" (i.e., the voltage level of the input, e.g., 1 or −1) can be described by the following equation:

$$vout(t) = A\cos\left[\left(\omega_c + \frac{vin\Delta\omega}{2}\right)t\right]$$

where:

"$A$" is the fixed amplitude of the output waveform.

"$\omega_c$" is the center carrier frequency in radians.

"$\Delta\omega$" is the shift frequency, and $$\Delta\omega = 2\pi\frac{|f_2 - f_1|}{2} = \frac{1}{4\tau}$$

where "$\tau$" is the period of one bit of the vin waveform, and $f_1$ and $f_2$ are the two frequencies that represents the binary input signal vin.

The output spectrum is the Fourier transform of the vout(t) signal, which are two sine functions offset from the center carrier frequency. Hence the output signal vout(t) has frequency $f_1$ or $f_2$ depending on the value of vin.

FIG. 3 is a schematic of a simplified transmitter (modulator) of one embodiment of the present invention. Frequencies $f_1$ and $f_2$ are sine waves generated by, for example, ring oscillators (not shown). A multiplexer 84 is connected to a buffer 85 that outputs signal $S_{OUT}$ to the wire connecting ICs. Multiplexer 84 selects between frequencies $f_1$ and $f_2$ using digital input bit $D_1$ as the control input. Thus $S_{out}$ is a frequency modulated signal modulated by the digital input signal $D_1$.

FIG. 4 is a schematic of a simplified non-coherent receiver (demodulator) of one embodiment of the present invention. $S_{in}$ is $S_{out}$ after the signal has traveled over the transmission line, e.g., wire. The receiver recovers the modulating signal $D_1$ (i.e., the envelope of the incoming signal $S_{in}$). Signal $S_{in}$ is connected to bandpass filters 86 and 88, where each bandpass filter is a resonant circuit centered around $f_1$ and $f_2$, respectively. The filtered outputs of bandpass filters 86 and 88 are connected to envelope detectors 90 and 92 respectively. Envelope detectors 90 and 92 output, for example, a predetermined value, when a frequency $f_1$ or $f_2$ is detected in a time period. Envelope detectors 90 and 92 are connected to decision circuit 96, which recovers the value of the bit $D_1$ depending on which envelope detector the predetermined value comes from. For example, $D_1=1$ for a predetermined value from envelope detector 90 and $D_1=0$ for a predetermined value from envelope detector 92.

While the transmitter and receiver circuits given in embodiments of the present invention can be used between any ICs on a PCB or between ICs on different PCBs connected together by a common backplane, an illustrative example is given using a Field Programmable Gate Array (FPGA) connected to an IC, including another FPGA, via a wire (trace) or a common backplane.

Figure 5:
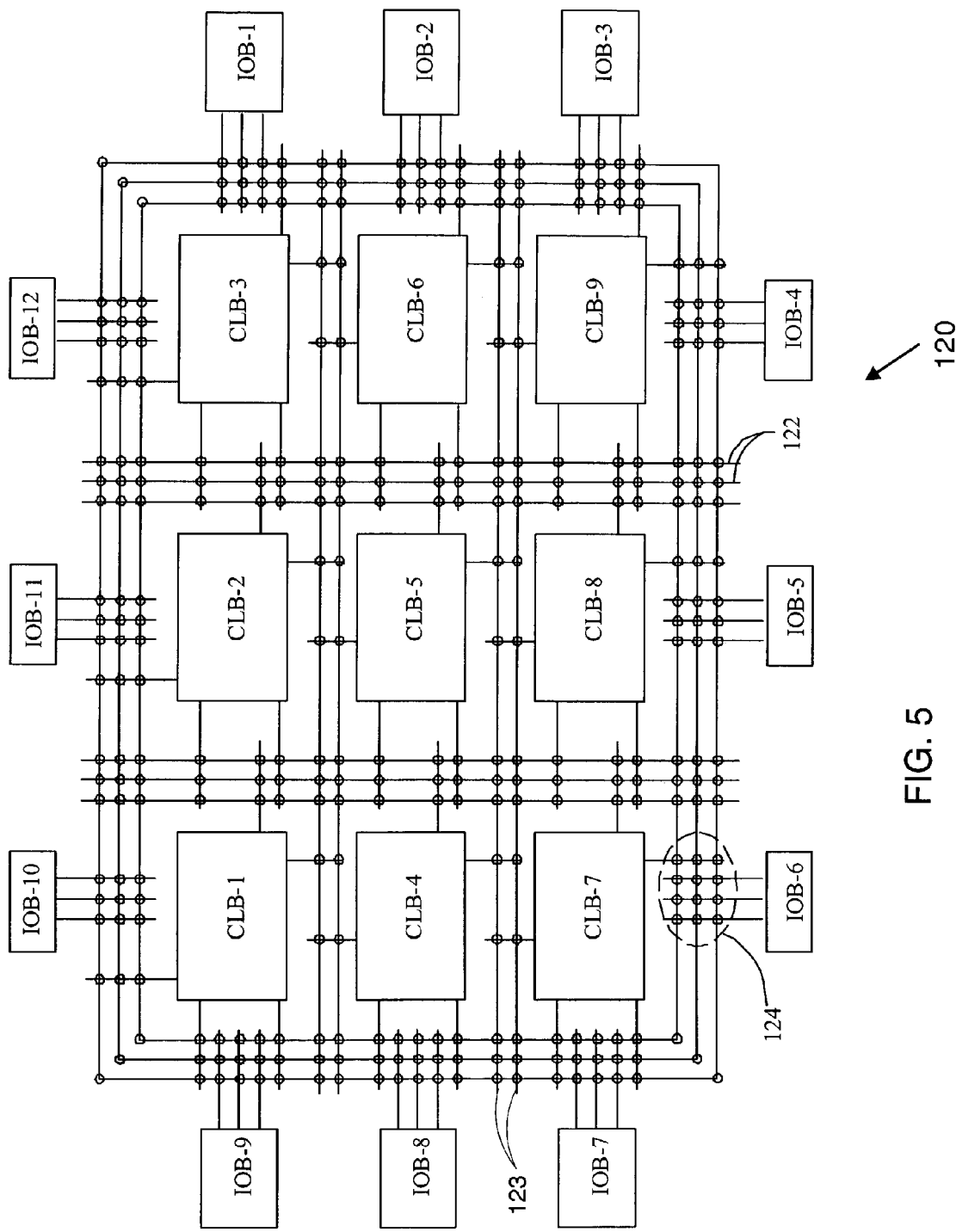
FIG. 5 shows a simplified schematic of a Field Programmable Gate Array.

FIG. 5 shows a simplified schematic of a Field Programmable Gate Array 120, which could be of one of the ICs in FIG. 2. FPGA 120 includes an array of CLBs, e.g., CLB-1 through CLB-9, that are surrounded by input/output blocks (IOBs), e.g., IOB-1 through IOB-12, and programmable interconnect resources that include vertical interconnect segments, e.g., 122, and horizontal interconnect segments, e.g., 123, extending between the rows and columns of CLBs and IOBs. Each CLB includes configurable combinational circuitry and optional registers that are programmed to implement a portion of a user's logic function. The interconnect segments of the programmable interconnect resources are configured using various switches (for example see area 124) to generate signal paths between the CLBs and between the CLBs and IOBs. Each IOB is configured to selectively utilize an associated pin (not shown) of FPGA 120 either as a device input pin, a device output pin, or a bi-directional pin. Although greatly simplified, FPGA 120 is generally consistent with FPGAs that are produced, for example, by Xilinx, Inc. of San Jose, Calif.

Figure 6:
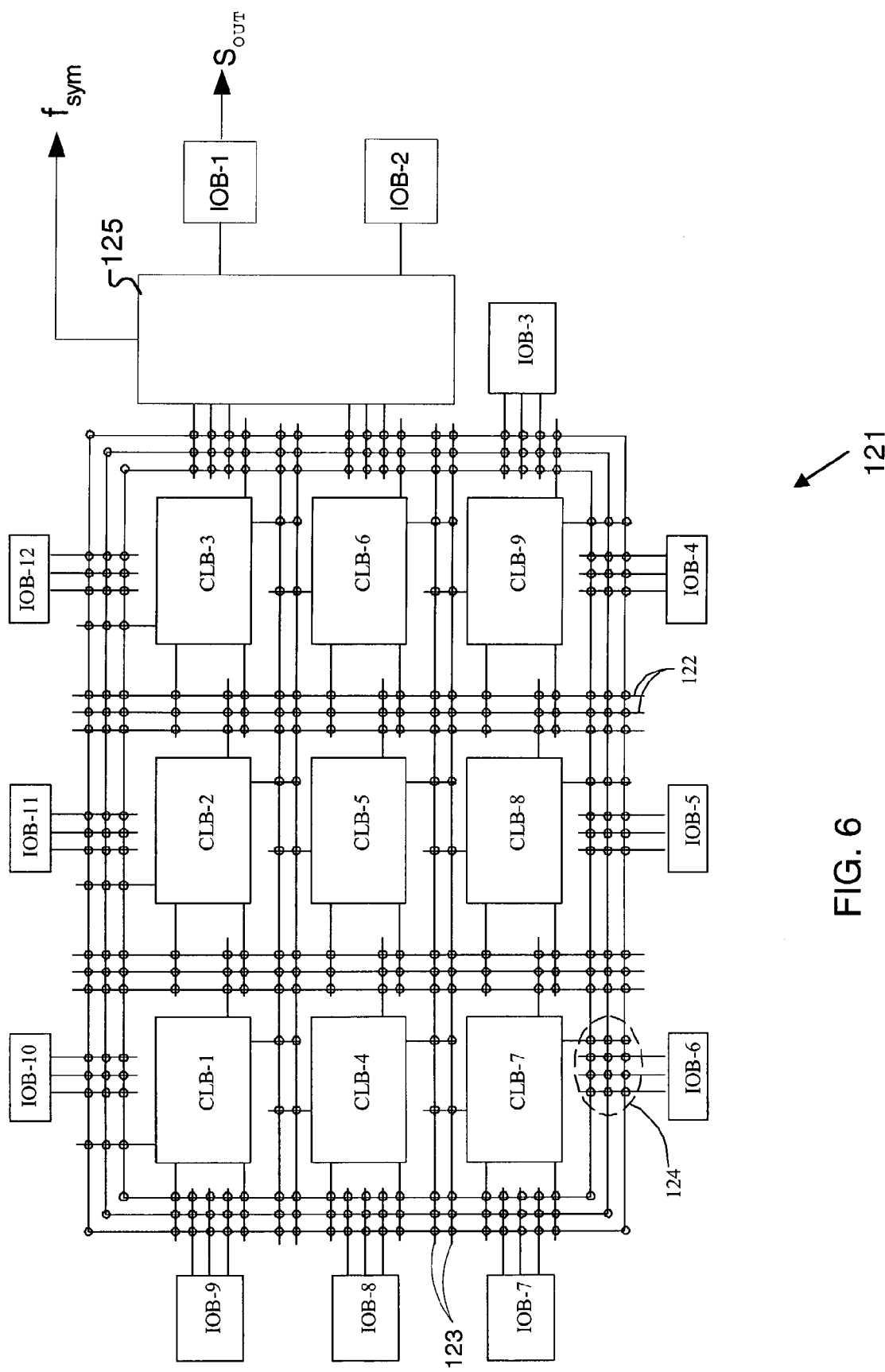
FIG. 6 is a simplified schematic of a FPGA having a transmitter circuit of an embodiment of the present invention.
Figure 11:
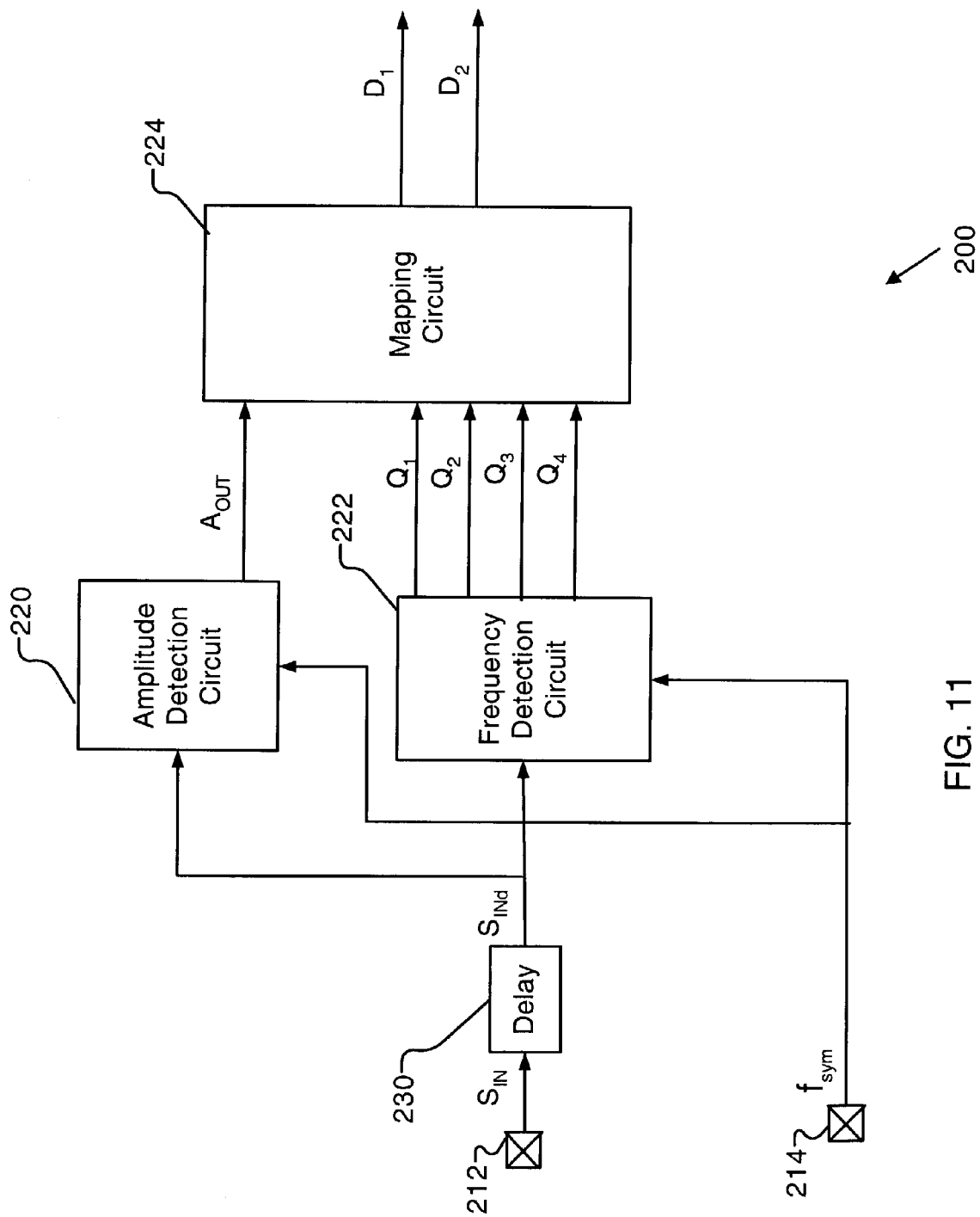
FIG. 11 is a schematic of a receiver circuit of a preferred embodiment of the present invention.

FIG. 6 is a simplified schematic of a FPGA having a transmitter circuit 125 of an embodiment of the present invention. The transmitter circuit 125 has been inserted between the interconnect segments coupling, for example, CLB-3 to IOB-1, and CLB-6 to IOB-2, and the I/O buffers, IOB-1 and IOB-2. Input data into transmitter circuit 125 is digital data from the FPGA. The transmitter circuit 125 converts the input digital data, i.e., 1's and 0's, into an amplitude frequency shift keying (AFSK) signal $S_{out}$. $S_{out}$ is sent to another IC using, for example, a metal trace. A clock of frequency $f_{sym}$ is forwarded from the transmitter circuit 125 to receiver circuit 200 (FIG. 11).

Figure 7:
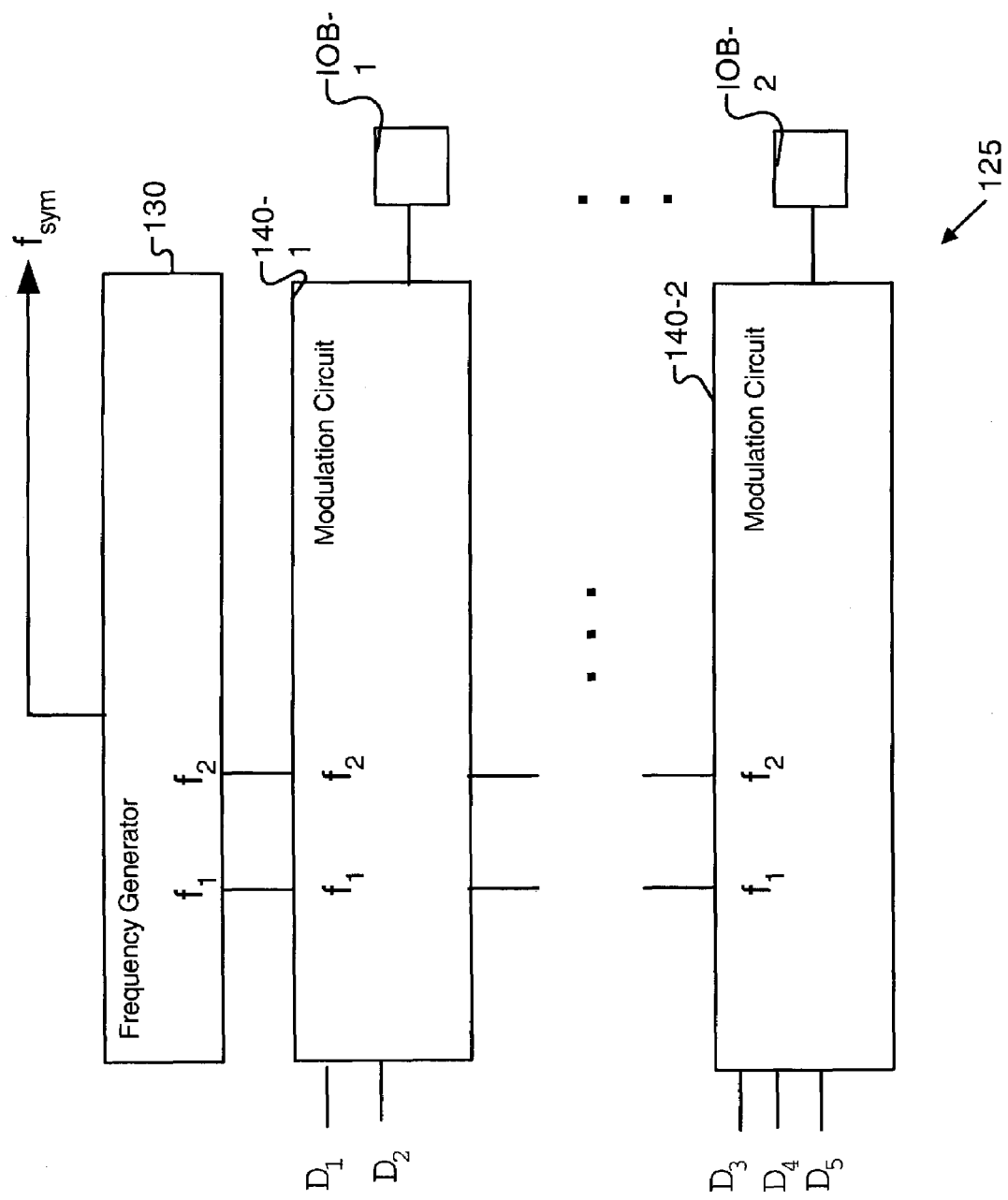
FIG. 7 is a more detail description of transmitter circuit of FIG. 6.

FIG. 7 is a more detail description of the transmitter circuit 125 of FIG. 6. Transmitter circuit 125 includes a frequency generator 130, a first modulation circuit 140-1 and an optional second modulation circuit 140-2 having circuitry the same as or similar to the first modulation circuit 140-1. Frequency generator 130 is connected to modulation circuits 140-1 and 140-2. The clock $f_{sym}$ (i.e., the clock with frequency $f_{sym}$) from frequency generator 130 is forwarded to the receiver 200 circuit (see FIG. 11). The other clocks $f_1$ and $f_2$ (i.e., clocks with frequencies $f_1$ and $f_2$, respectively) output by frequency generator 130 are inputted by modulation circuits 140-1 and 140-2. Modulation circuit 140-1 has digital inputs, e.g., $D_1$ and $D_2$, which are converted to an AFSK signal. AFSK signal is buffered by IOB-1 to produce $S_{out}$ (see FIG. 6). Optional modulation circuit 140-2 also has digital inputs, e.g., $D_3$ to $D_5$, which are converted to an AFSK signal and output from transmitter circuit 125 via IOB-2 (not shown).

Figure 8:
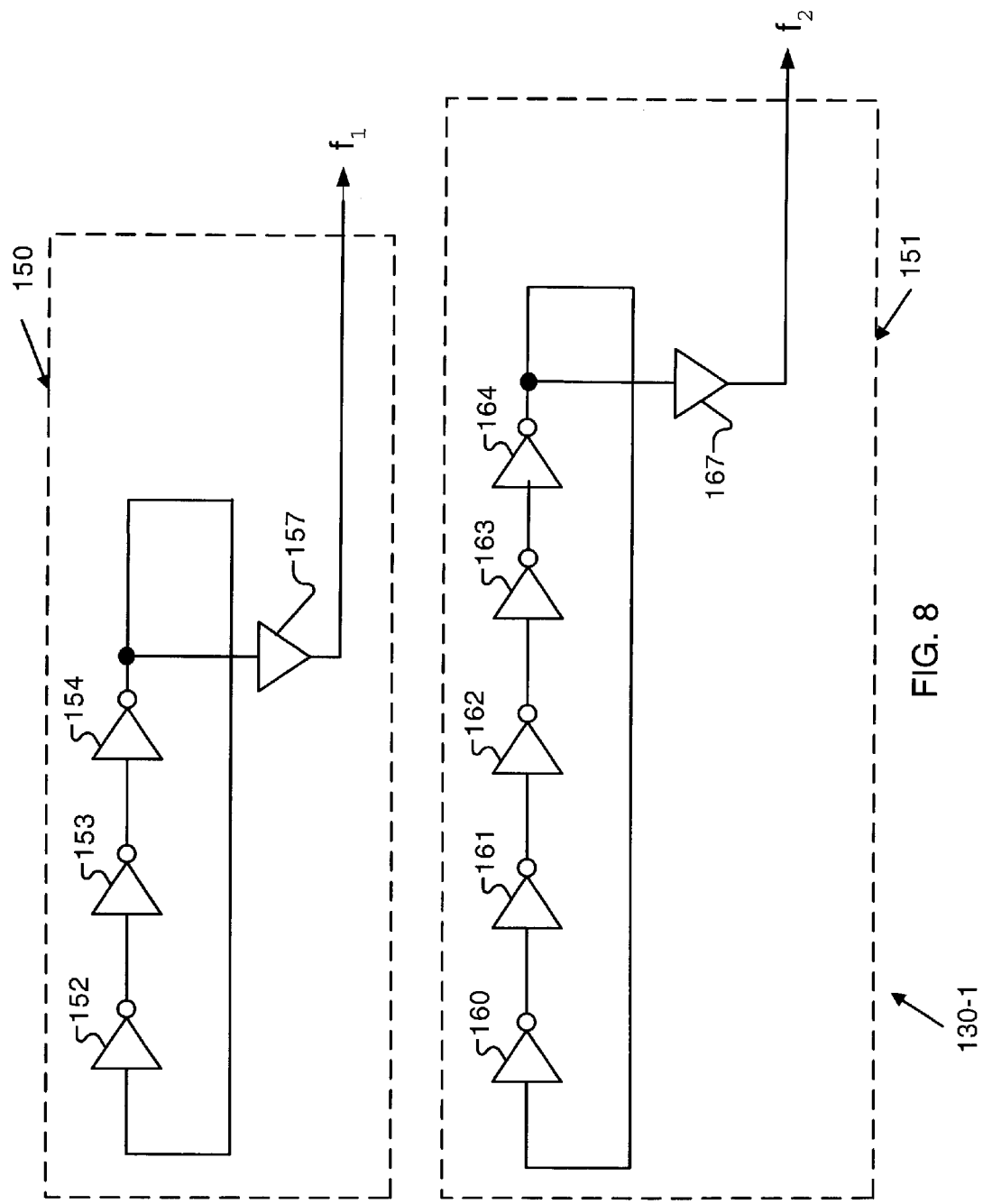
FIG. 8 is a circuit diagram for generating different frequencies of an embodiment of the present invention.

FIG. 8 is a circuit diagram for a frequency generator 130-1 of an embodiment of the present invention. Frequency generator 130-1 can be used for the frequency generator circuit 130 of FIG. 7. Frequency generator 130-1 has two ring oscillators 150 and 151. One ring oscillator 150 has three inverters 152, 153, and 154 connected together in feedback circuit. A buffer 157 is connected to inverter 154. The ring oscillator 150 produces a clock of frequency $f_1$ via buffer circuit 157. Assuming that the inverter delay is 50 ps, the frequency $f_1$ is approximately 6.7 GHz. Another ring oscillator 151 has five inverters 160, 161, 162, 163, and 164 connected together in feedback circuit. A buffer 167 is connected to inverter 164. The ring oscillator 151 produces a clock of frequency $f_2$ via buffer circuit 167. Assuming that the inverter delay is 50 ps, the frequencies $f_2$ and $f_{sym}$ are approximately 4 GHz.

Figure 9:
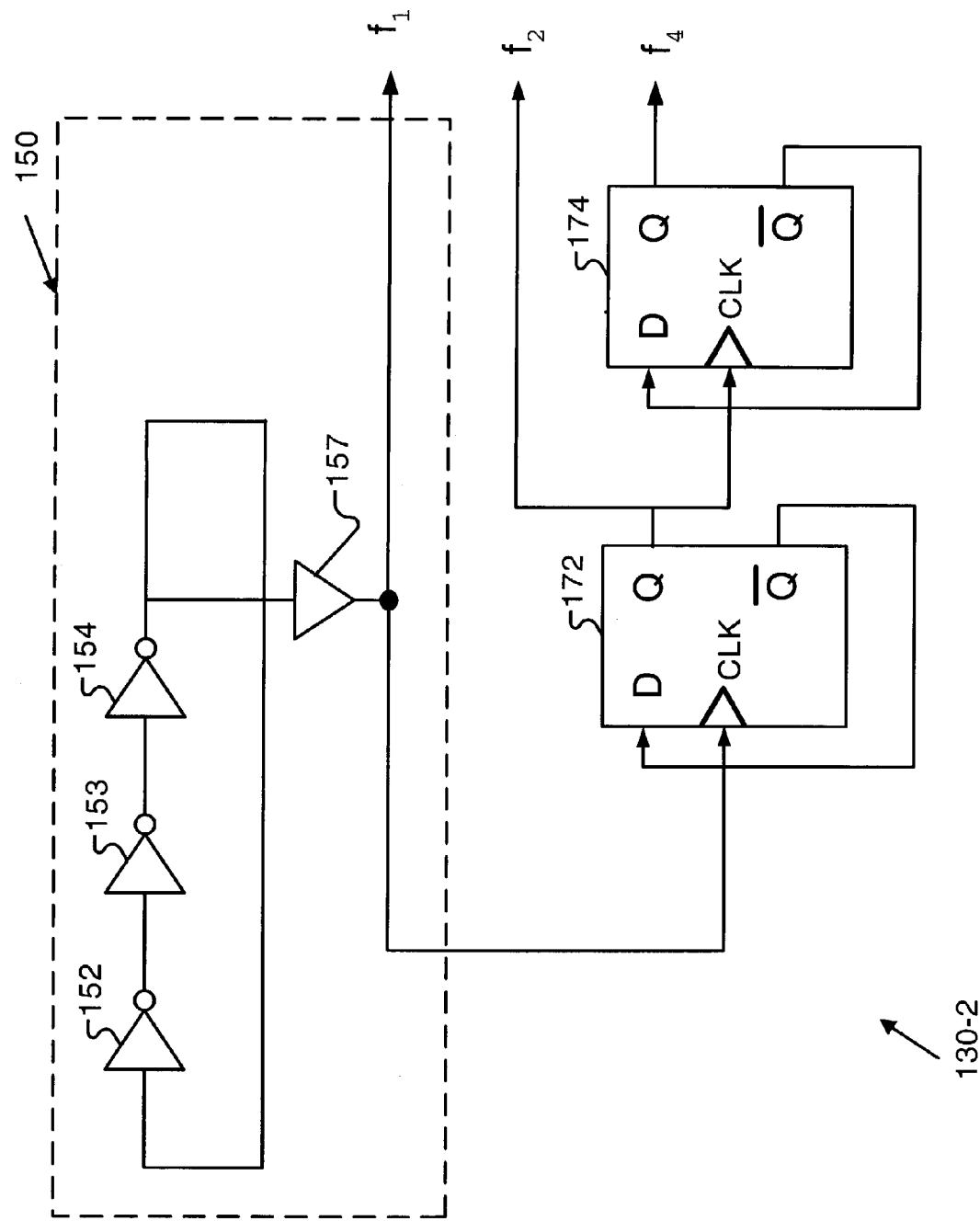
FIG. 9 is a circuit diagram for a frequency generator of a preferred embodiment of the present invention.

FIG. 9 is a circuit diagram for a frequency generator 130-2 of a preferred embodiment of the present invention. Frequency generator 130-2 can be used for the frequency generator circuit 130 of FIG. 7. The ring oscillator 150 produces a clock of frequency $f_1$. The output of buffer 157 also is connected to the edge-triggered clock input of flip-flop 172. The complemented Q output of flip-flop 172 is fed back to the D input. The Q output of flip-flop 172 produces clock $f_2$, where clock $f_2$ is in synchronization with and one half the frequency of clock $f_1$.

Frequency generator 130-2 may optionally include another flip-flop 174 connected to flip-flop 172. The Q output of flip-flop 172 is received as the clock input to flip-flop 174. The complemented Q output of flip-flop 174 is fed back to the D input. The Q output of flip-flop 174 produces clock $f_4$, where clock $f_4$ is in synchronization with and one quarter the frequency of clock $f_1$.

In order to illustrate the AFSK system of an embodiment of the present invention, an example of digital data comprising two bits, i.e., D2 and D1, two amplitudes, i.e., A1 and A2, and two clocks of frequencies $f_1$ and $f_2$ are used. For this example, the symbol frequency $f_{sym}$ is set equal to $f_2$, where $(1/f_{sym})$ is the time period for one bit of digital data, e.g., D1 or D2. In other embodiments one or more bits, one or more amplitudes, and one or more clocks with various frequencies are used, as would be evident to one of ordinary skill in the art. In an alternative embodiment frequency shift keying is used alone without amplitude shift keying.

Figure 10:
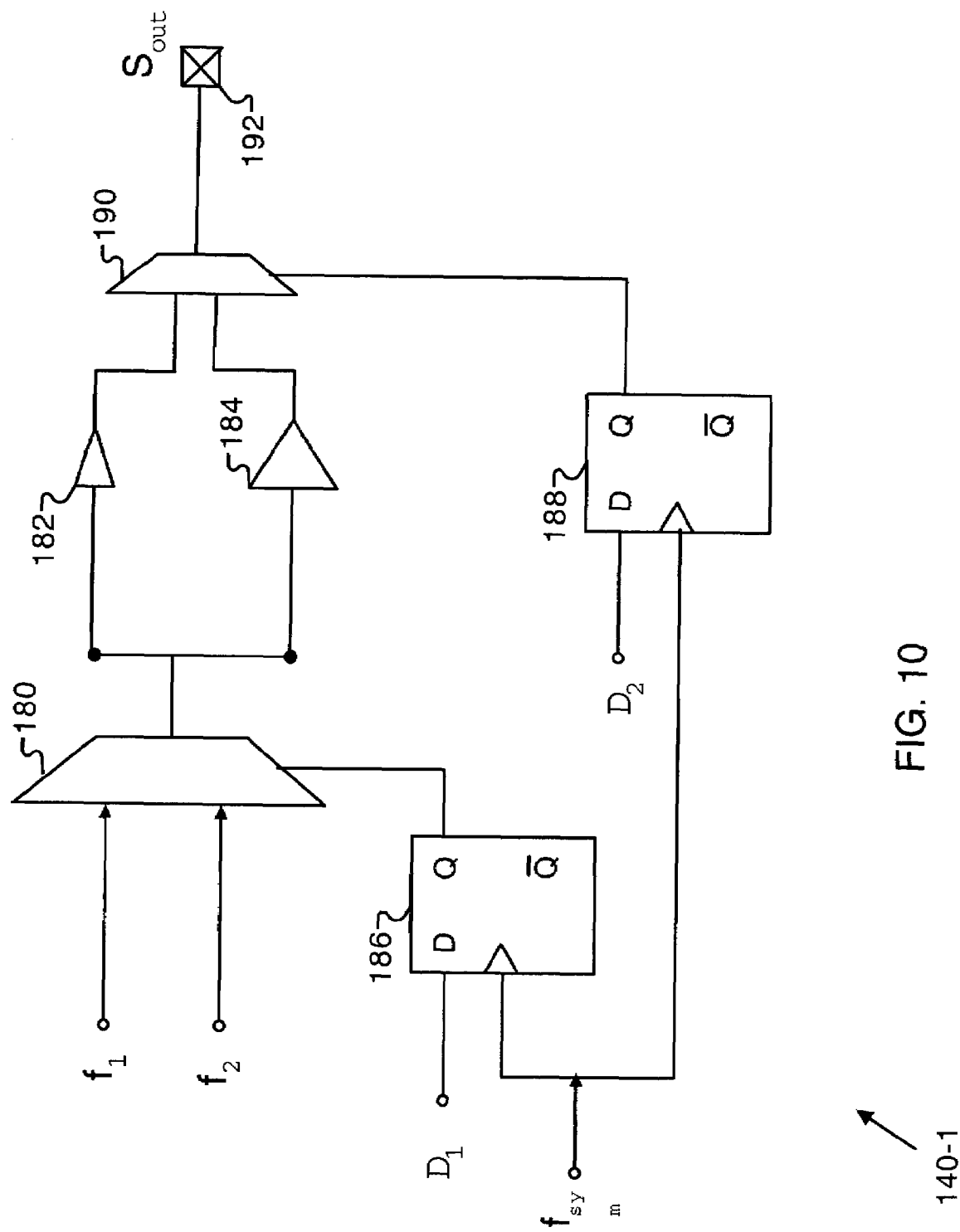
FIG. 10 is a schematic of a modulation circuit of a preferred embodiment of the present invention.

FIG. 10 is a schematic of a modulation circuit 140-1 of a preferred embodiment of the present invention. Clocks with frequencies $f_1$ and $f_2$ are input into multiplexer 180. The digital input D1, via flip-flop 186, selects which clock frequency goes to amplifiers 182 and 184 from multiplexer 180. Amplifier 184 amplifies the clock signal (giving an amplitude A1) from multiplexer 180 more than amplifier 182 (giving an amplitude A2). The digital input D2, via flip-flop 188, selects which amplified clock signal goes to output 192 producing $S_{out}$ from multiplexer 190. Hence $S_{out}$ is a clock with a frequency $f_1$ or $f_2$ with an amplitude A1 or A2 and represents the bits (D2, D1) for the time period of $(1/f_2)$, where $f_{sym}=f_2$.

The input side of a preferred embodiment of the present invention is now described. The input side, e.g., IC 51, receives the AFSK signal via, for example, the metal trace 63, and demodulates the amplitude and frequency of the AFSK signal in order to recover the digital data of the signal, e.g., (D2, D1). Examples of the input side IC include a field programmable gate array, a programmable logic device, a digital signal processor, a microprocessor, an audio processor, a video graphics processor, and an applications specific integrated circuit.

FIG. 11 is a schematic of a receiver circuit 200 of a preferred embodiment of the present invention. AFSK signal $S_{IN}$ is received at input buffer 212 and delayed by delay circuit 230. The input signal $S_{IN}$ is delayed with respect to forwarded clock $f_{sym}$, where clock $f_{sym}$ is used to reset flip-flops and a latch in the amplitude detection circuit 220 and frequency detection circuit 222. The delayed input signal $S_{INd}$ is input by the amplitude detection circuit 220 and frequency detection circuit 222. The symbol clock $f_{sym}$ forwarded from transmitter circuit 125 of FIG. 7, is received at input buffer 214 and proceeds to frequency detection circuit 222 and amplitude detection circuit 220. The frequency detection circuit 222 receives the frequency modulated input signal $S_{IN}$ and produces a 4 bit output (Q4, Q3, Q2, Q1), that indicates a count of the number of edges in input signal $S_{IN}$ during the time period ($1/f_{sym}$). The count determines which clock frequency was received. Concurrently, amplitude detection circuit 220 decodes the amplitude from the input signal $S_{IN}$ and produces a one bit output $A_{out}$, that has a value 1 for a high voltage amplitude and a 0 for a low voltage amplitude. The mapping circuit 224 receives $A_{out}$ and (Q4, Q3, Q2, Q1) and uses a combinational logic circuit implementation of a table to map the inputs, ($A_{out}$, Q4, Q3, Q2, Q1) to the two bit digital data (D2, D1). Hence the original digital data (D2, D1) sent by the transmitter circuit 125 is recovered at receiver circuit 200.

Figure 12:
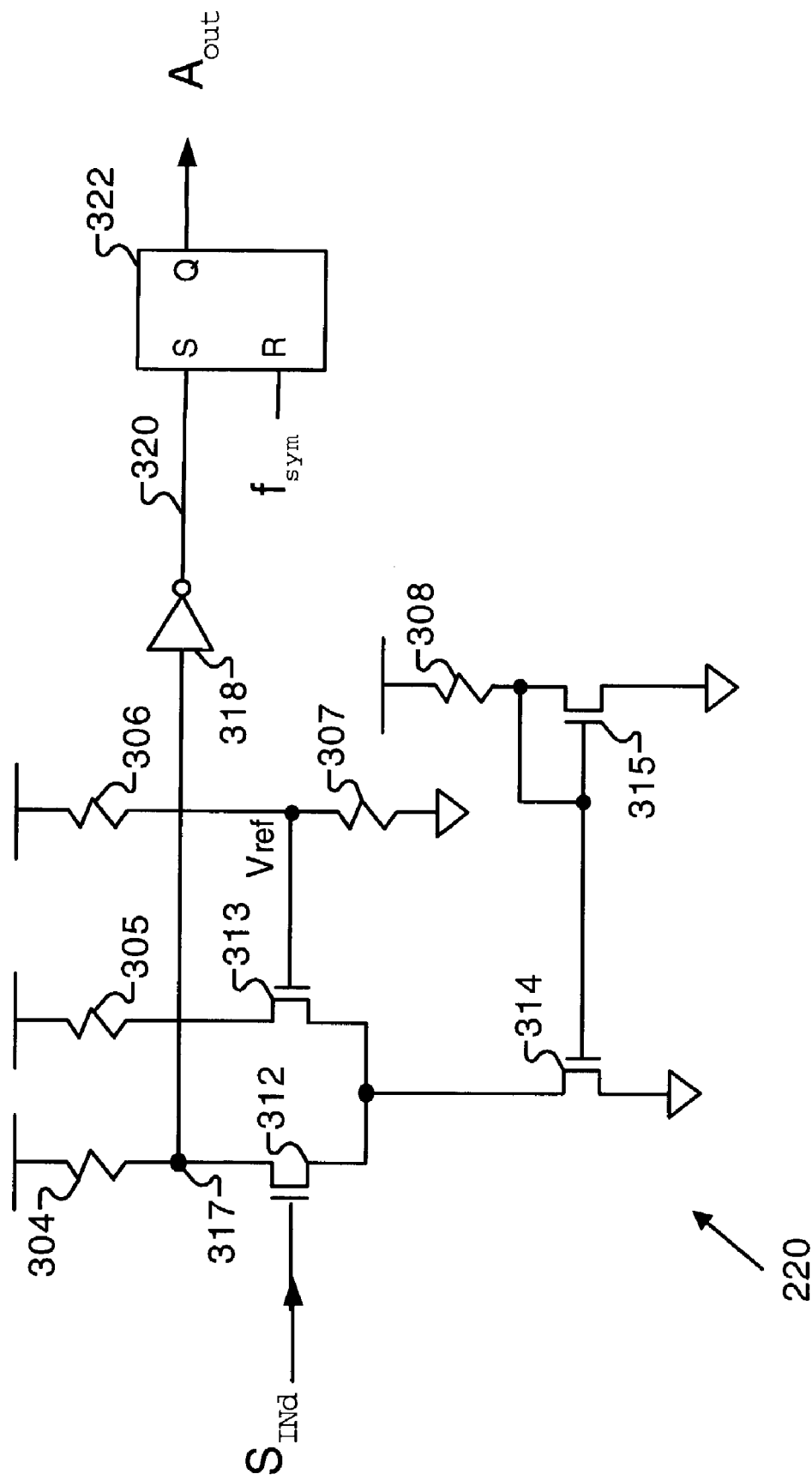
FIG. 12 is a circuit diagram of the amplitude detection circuit in FIG. 11.

FIG. 12 is a circuit diagram of the amplitude detection circuit 220 in FIG. 11. It comprises five resistors 304-308 and four transistors 312-315. Detection circuit 220 receives amplitude frequency shifted signal $S_{INd}$ at the gate of transistor 312. Transistor pair 312 and 313 functions as a differential amplifier, which compares the voltage level of $S_{INd}$ to $V_{ref}$ (generated by resistor pair 306 and 307). $V_{ref}$ is set to a value such that the default current path is through transistor 313. The voltage at node 317 has a low voltage level when $S_{INd}$ has a higher voltage than $V_{ref}$, and a high voltage level otherwise. The logic level represented by the voltage at node 317 is inverted by inverter 318 and stored in latch 322, where the output 320 of the inverter 318 is the S input to latch 322. The latch output is $A_{out}$, which has a logical 1 when $S_{INd}$ has a higher voltage than $V_{ref}$, and a logical 0 otherwise. The latch 322 is reset by $f_{sym}$.

Figure 13:
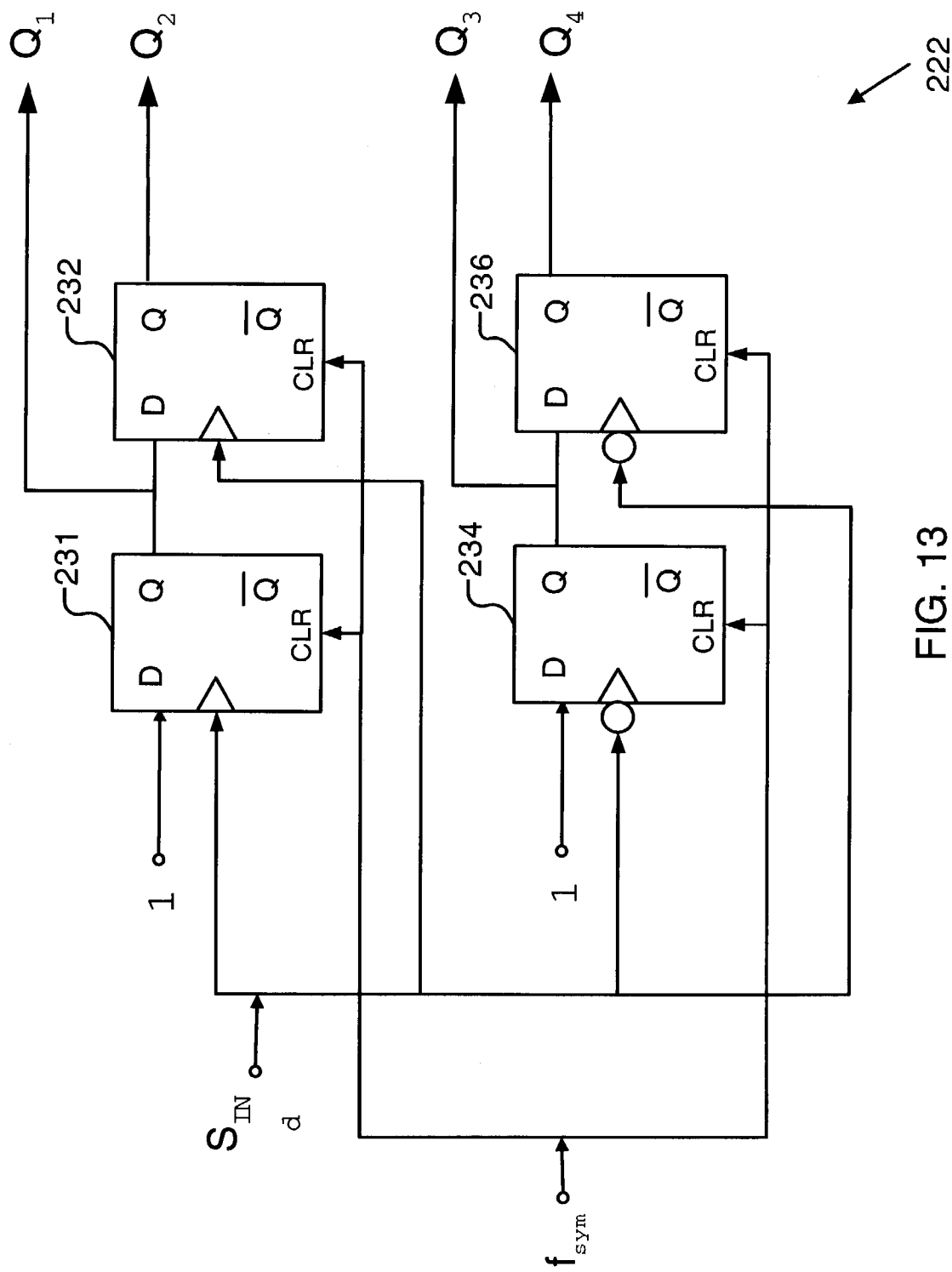
FIG. 13 is a circuit diagram of the frequency detection circuit of FIG. 11.

FIG. 13 is a circuit diagram of the frequency detection circuit 222 of FIG. 11. Frequency detection circuit 222 comprises a plurality of rising edge triggered flip-flops, such as flip-flops 231 and 232 and a plurality of falling edge triggered flip-flops, such as flip-flops 234 and 236. The flip-flops 231 and 232 count the number of rising edges in delayed input signal $S_{INd}$. Input signal $S_{INd}$ is connected to the rising edge triggered clock inputs of flip-flops 231 and 232. The D input of flip-flop 231 is tied high to logical 1. The Q output of flip-flop 231 is connected to the D input of flip-flop 232 and the output Q1. The Q output of flip-flop 232 is connected the output Q2. The clock $f_{sym}$.clears flip-flops 231 and 232 every symbol period. The flip-flops 234 and 236 count the number of falling edges in delayed input signal $S_{INd}$. Input signal $S_{INd}$ is connected to the falling edge triggered clock inputs of flip-flops 234 and 236. The D input of flip-flop 234 is tied high to logical 1. The Q output of flip-flop 234 is connected to the D input of flip-flop 236 and the output Q3. The Q output of flip-flop 236 is connected the output Q4. The clock $f_{sym}$.clears flip-flops 234 and 236 every symbol period. To illustrate how circuit 222 functions reference is made to the timing diagram in FIG. 14. In an alternative embodiment an adder, such as a ripple carry adder, is used to count the number of rising and falling edges.

Figure 14:
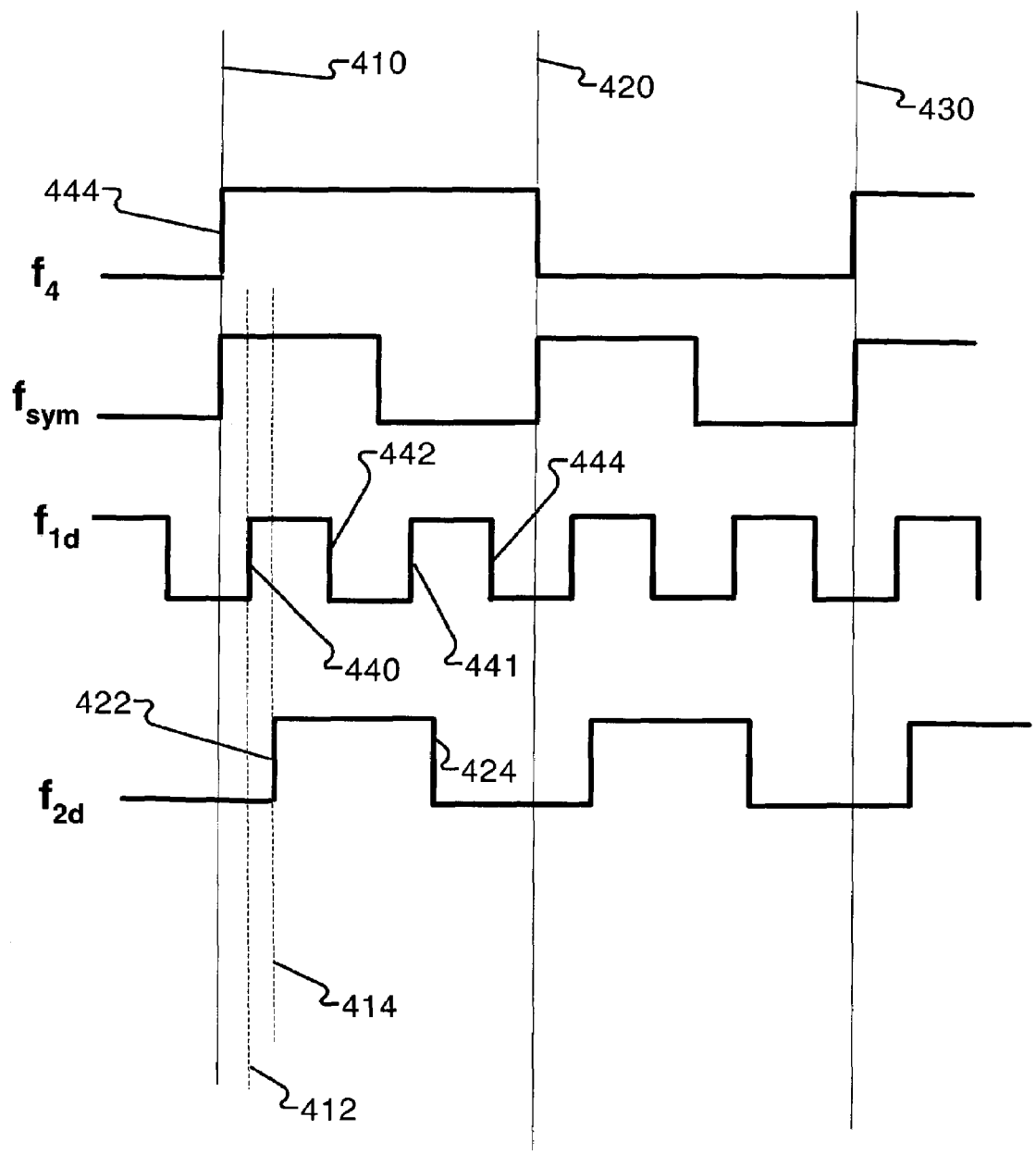
FIG. 14 is a timing diagram of the clocks used in the AFSK two bit example.

FIG. 14 is a timing diagram showing the timing relationships between clocks $f_4$, $f_{sym}$, $f_{2d}'$ and $f_{1d}$. Assuming clock $f_{sym}$ has a frequency equal to $f_{2d}$ and a clock period T1 that starts at time 410 and ends at time 420, clock f d starts at time 412 due to delay circuit 230 in FIG. 11. Flip-flops 231 and 232 of FIG. 13 count rising edges 440 and 441 to give Q1=1 and Q2=1. Flip-flops 234 and 235 of FIG. 13 count falling edges 442 and 444 to give Q3=1 and Q4=1. Clock $f_{2d}$ starts at time 414 because of the delay circuit 230 in FIG. 11 and a further transmission delay when compared to clock $f_{1d}$. Flip-flops 231 and 232 of FIG. 13 count rising edge 422 within time period T1 to give Q1=1 and Q2=0. Flip-flops 234 and 235 of FIG. 13 count falling edge 424 to give Q3=1 and Q4=0. Hence within time period T1, when $S_{INd}=f_{1d}$, four clock edges are counted and when $S_{INd}=f_{2d}$, two clock edges are counted.

From FIG. 14 if $f_4$ is used in place of $f_{sym}$, then the time period T2 for clock $f_{sym}$ is from time 410 to time 430. Within time period T2, when $S_{INd}=f_{1d}$, eight clock edges are counted and when $S_{INd}=f_{2d}$, four clock edges are counted. Thus the difference of clock edges between clocks $f_{1d}$ and $f_{2d}$ for $f_{sym}=f_{2d}$ versus $f_{sym}=f_4$ has increased from two to four. The larger difference number improves error recovery, if the count is slightly off. On the other hand, using $f_{sym}=f_4$ has again halved the data rate when compared to using $f_{1d}$ to send binary data.

When $f_{sym}=f_{2d}$ the data rate when compared to using $f_{1d}$ to send binary data is half. This is because within T1 receiving $f_{1d}$ or $f_{2d}$ means receiving one bit of data, while using $f_{1d}$ and amplitude modulation within T1 gives two bits of data. When AFSK is used, then within T1, two bits of data are received, so the data rate is the same as using $f_{1d}$, and in addition, the adverse transmission line effects are significantly reduced. In one alternative embodiment $f_{sym}=f_4$ is used, when the communication path between the two ICs supports a data rate that is on the order of half of the processing speed on an IC.

The outputs of frequency detection circuit 222 and amplitude detection circuit 220 can be used to recover the original digital input data bits, D2 and D1. Table 1 shows the relationship between the values of the decoded bit D11 and the outputs (Q0 to Q4) of frequency detection circuit 222, and the value of the decoded amplitude bit D2 and the output Aout of the amplitude detection circuit 220. A total of two decoded bits (corresponding to four different values) are recovered.

TABLE 1

| $A_{out}$ | $Q_1$ | $Q_2$ | $Q_3$ | $Q_4$ | $D_2$ | $D_1$ |
|---|---|---|---|---|---|---|
| 0 | 1 | 0 | 1 | 0 | 0 | 0 |
| 0 | 1 | 1 | 1 | 1 | 0 | 1 |
| 1 | 1 | 0 | 1 | 0 | 1 | 0 |
| 1 | 1 | 1 | 1 | 1 | 1 | 1 |

Mapping circuit 224 of FIG. 10 is a combinational logic implementation of Table 1. The combinational logic implementation is well known to one of ordinary skill in the arts and is not included so as not to obscure the invention.

The use of two digital input bits (D2, D1), and AFSK using 2 modulation frequencies and 2 amplitudes, was for illustration purposes and other embodiments have various other combinations of digital input bits, modulation frequencies, and amplitudes. Also while data is illustrated as going from a sender IC to a receiver IC, this was for ease of explanation only. It is well understood that an IC can send and receive data and that an I/O buffer on an IC may have bi-directional data transfer.

An alternative embodiment of the present invention uses FSK. For example, to represent two bits (D1, D0), four frequencies are used with one amplitude. The transmitter and receiver circuit example as given above can readily be modified to accommodate the four frequencies.

In addition, looking at the FPGA in FIG. 5, similar AFSK or FSK signaling, as described above, can be used between different components, e.g., CLBs, within an IC. For example CLB-1 can convert its digital data to an AFSK signal using a circuit similar to FIG. 10. The AFSK signal is sent to CLB-9 on one of the interconnection paths in FPGA 120. CLB-9, using circuitry similar to that shown in FIG. 11, decodes the AFSK signal to recover the original digital data from CLB 1. Because circuitry on an IC is increasingly more and more dense, using the encoding/modulation and the decoding/demodulation circuitry, as given above, adds only a small amount of circuitry.

It can be seen from the above description that a novel communication system has been disclosed. Those having skill in the relevant arts of the invention will now perceive various modifications and additions, which may be made as a result of the disclosure herein. Accordingly, all such modifications and additions are deemed to be within the scope of the invention, which is to be limited only by the appended claims and their equivalents.

The invention claimed is:

1. A system for communicating between two integrated circuits, comprising:
   a first integrated circuit having a transmitter circuit for converting digital data into a frequency modulated signal, the first integrated circuit positioned on a first printed circuit board for transmission of the frequency modulated signal via a transmission line to a second integrated circuit;
   the frequency modulated signal representing the digital data as the frequency modulated signal includes signal components having frequencies representing logic states of the digital data;
   the second integrated circuit electrically coupled to the transmission line and having a receiver circuit for converting the frequency modulated signal back to the digital data, the second integrated circuit positioned on the first printed circuit board or on a second printed circuit board, wherein the second printed circuit board is connected to the first printed circuit board via a common backplane;
   the frequency modulated signal including an amplitude frequency shift keying (AFSK) signal the modulation circuit comprising;
   a frequency generator configured to generate a plurality of clock signals, each clock signal of the plurality of clock signals having a predetermined frequency;
   a modulation circuit configured to receive the digital data and at least one of the plurality of clock signals and configured to generate the AFSK signal;
   a first multiplexer configured to select a clock signal of the plurality of clock signals using a first bit of the digital data;
   an amplifier connected to the first multiplexer for amplifying the selected clock signal; and
   a second multiplexer connected to the amplifier and configured to select the selected clock signal, the second multiplexer controlled by a second bit of the digital data.

2. The system of claim 1 wherein the receiver circuit, comprises a bandpass filter coupled to an envelope detector.

3. The system of claim 1 wherein the frequency generator comprises a ring oscillator having a plurality of inverters for generating a clock signal of the plurality of clock signals.

4. The system of claim 1 wherein the frequency generator comprises a ring oscillator, comprising a plurality of inverters, coupled to flip-flop for generating the plurality of clock signals.

5. The system of claim 1 wherein the receiver circuit comprises:
   an amplitude detection circuit configured to determine an indication of amplitude of a plurality of amplitudes of the AFSK signal;
   a frequency detection circuit, comprising a counting circuit for determining a number of edges in the AFSK signal in a predetermined time period, wherein the number gives an indication of a frequency of the AFSK signal; and
   a mapping circuit, comprising digital logic, receiving the indication of amplitude and the indication of the frequency and generating at least one bit of the digital data.

6. The system of claim 5 wherein the amplitude detection circuit comprises a differential amplifier coupled to a current mirror circuit and a latch.

7. The system of claim 5 wherein the counting circuit comprises a first counter comprising, a first plurality of flip-flops, configured to count a number of rising edges and a second counter, comprising a second plurality of flip-flops, configured to count a number of falling edges.

8. The system of claim 7 further comprising:
   a symbol clock received from the transmitter circuit for resetting the first and second plurality of flip-flops; and
   a delay circuit for delaying the AFSK signal with respect to the symbol clock.

9. The system of claim 5 wherein the counting circuit comprises an adder circuit configured to count the number of edges.

10. The system of claim 1 wherein the first integrated circuit is selected from the group consisting of a field programmable gate array, a programmable logic device, digital signal processor, a microprocessor, an audio processor, a video graphics processor, and an applications specific integrated circuit.

11. A method for communicating between two integrated circuits, comprising:
   transforming digital data from a first integrated circuit into a frequency modulated signal for transmission of the frequency modulated signal via a transmission line to a second integrated circuit; the first integrated circuit being positioned on a first printed circuit board;
   the frequency modulated signal representing the digital data as the frequency modulated signal includes signal components having frequencies representing logic states of the digital data;
   transmitting the frequency modulated signal to the second integrated circuit electrically coupled to the transmission line, the second integrated circuit being positioned on the first printed circuit board or on a second printed circuit board, wherein the second printed circuit board is connected to the first printed circuit board via a common backplane;

recovering the digital data from the frequency modulated signal in the second integrated circuit;

the frequency modulated signal comprises an amplitude frequency shift keying (AFSK) signal, wherein the AFSK signal is formed by a modulation circuit comprising: a first multiplexer configured to select a clock signal of a plurality of clock signals using a first bit of the digital data; an amplifier connected to the first multiplexer for amplifying the selected clock signal; and a second multiplexer connected to the amplifier and configured to select the selected clock signal, the second multiplexer being controlled by a second bit of the digital data signal; and the recovering including:
demodulating the frequency modulated signal to produce a plurality of intermediary bits; and
mapping the plurality of intermediary bits to the digital data.

12. The method of claim 11 wherein the frequency modulated signal includes amplitude modulation, wherein the amplitude modulation is determined from at least one bit of the digital data.

13. The method of claim 12 wherein the recovering comprises detecting an amplitude of the frequency modulated signal.

14. The method of claim 11 wherein the transforming comprises:
generating a plurality of clock signals having different frequencies; and
selecting a clock signal of the plurality of clock signals based on one or more bits of the digital data.

15. The method of claim 14 further comprising forwarding a symbol clock signal of the plurality of clock signals from the first integrated circuit to the second integrated circuit.

16. The method of claim 11 wherein demodulating the frequency modulated signal comprises determining a number of edges in the frequency modulated signal.

17. The method of claim 11 further comprising, generating a plurality of clock signals by a plurality of ring oscillators for use in transforming digital data from the first integrated circuit into the frequency modulated signal.

18. A system for communicating data between a plurality of components in an integrated circuit, comprising:
a first component of the plurality of components having an output circuit for converting digital data of the first component into a frequency modulated signal, wherein the output circuit comprises: a first multiplexer configured to select a clock signal of a plurality of clock signals using a first bit of the digital data; an amplifier connected to the first multiplexer for amplifying the selected clock signal; and a second multiplexer connected to the amplifier and configured to select the selected clock signal, the second multiplexer being controlled by a second bit of the digital data signal;
the frequency modulated signal representing the digital data as the frequency modulated signal includes signal components having frequencies representing logic states of the digital data;
a second component of the plurality of components having an input circuit for converting the frequency modulated signal back to the digital data, wherein the input circuit comprises a multiplexer configured to select the selected clock signal; and
an electrical connection in the integrated circuit coupled to the first component and the second component for communicating between the input and the output circuits;
the input circuit including:
a frequency detection circuit having a counter circuit configured to determine an indication of a number of edges of the frequency modulated signal; and
a mapping circuit having digital logic for receiving the indication and generating at least one bit of the digital data.

19. The system of claim 18 wherein a component of the plurality of components includes a Configurable Logic Block (CLB) or a Input/Output Block (IOB) of an FPGA.

20. The system of claim 18 wherein the output circuit comprises:
a modulation circuit configured to receive the digital data and at least one of a plurality of clock signals and to generate the frequency modulated signal using the digital data.

21. The system of claim 20 further comprising:
a ring oscillator for generating a clock signal of the plurality of clock signals.

22. A system for communicating data between two integrated circuits, comprising:
a means for transforming digital data from a first integrated circuit into a frequency modulated signal, the first integrated circuit positioned on a first printed circuit board for transmission of the frequency modulated signal via a transmission line to a second integrated circuit, and wherein the means for transforming digital data includes a means for generating a plurality of clock signals with different frequencies;
the frequency modulated signal representing the digital data as the frequency modulated signal includes signal components having the frequencies representing logic states of the digital data;
the second integrated circuit being positioned on the first printed circuit board or on a second printed circuit board and electrically coupled to the transmission line, wherein the second printed circuit board is connected to the first printed circuit board via a common backplane;
a means in the second integrated circuit for recovering the digital data from the frequency modulated signal; and
wherein the frequency modulated signal comprises an amplitude frequency shift keying (AFSK) signal wherein the AFSK signal is formed by a modulation circuit comprising: a first multiplexer configured to select a clock signal of a plurality of clock signals using a first bit of the digital data; an amplifier connected to the first multiplexer for amplifying the selected clock signal; and a second multiplexer connected to the amplifier and configured to select the selected clock signal, the second multiplexer being controlled by a second bit of the digital data signal;
the means in the second integrated circuit for recovering the digital data including:
a frequency detection circuit having a counter circuit configured to determine an indication of a number of edges of the frequency modulated signal; and
a mapping circuit having digital logic for receiving the indication and generating at least one bit of the digital data.

* * * * *